United States Patent [19]

Rieppel et al.

[11] Patent Number: 4,493,970

[45] Date of Patent: Jan. 15, 1985

[54] SLAG AND FUME COLLECTOR FOR AIR CARBON-ARC CUTTING AND GOUGING TORCHES

[75] Inventors: Perry J. Rieppel, Worthington; William J. Coughlin, Lancaster, both of Ohio

[73] Assignee: Arcair Company, Lancaster, Ohio

[21] Appl. No.: 458,600

[22] Filed: Jan. 17, 1983

[51] Int. Cl.³ ............................................. B23K 9/32

[52] U.S. Cl. ............................... 219/137.41; 219/70; 219/136

[58] Field of Search ................. 219/137.41, 70, 69 R, 219/136; 373/8, 9

[56] References Cited

U.S. PATENT DOCUMENTS

| | | | |
|---|---|---|---|
| 2,706,236 | 4/1955 | Stepath et al. | 219/15 |
| 2,870,320 | 1/1959 | Mathews | 219/74 |
| 3,524,038 | 8/1970 | O'Kelly, Jr. | 219/70 |
| 3,980,860 | 9/1976 | Howell et al. | 219/137.41 X |

*Primary Examiner*—Roy N. Envall, Jr.
*Assistant Examiner*—Catherine M. Sigda
*Attorney, Agent, or Firm*—James C. Simmons; E. Eugene Innis

[57] ABSTRACT

A method and apparatus for collecting molten metal and/or slag together with fume generated by the air carbon-arc cutting and gouging process. The method and apparatus are characterized in that a refrigerated surface is used to intercept and cool the molten particles to prevent adherence of the particles to the collector or agglomeration of the particles inside the collector.

6 Claims, 6 Drawing Figures

FIG. 1
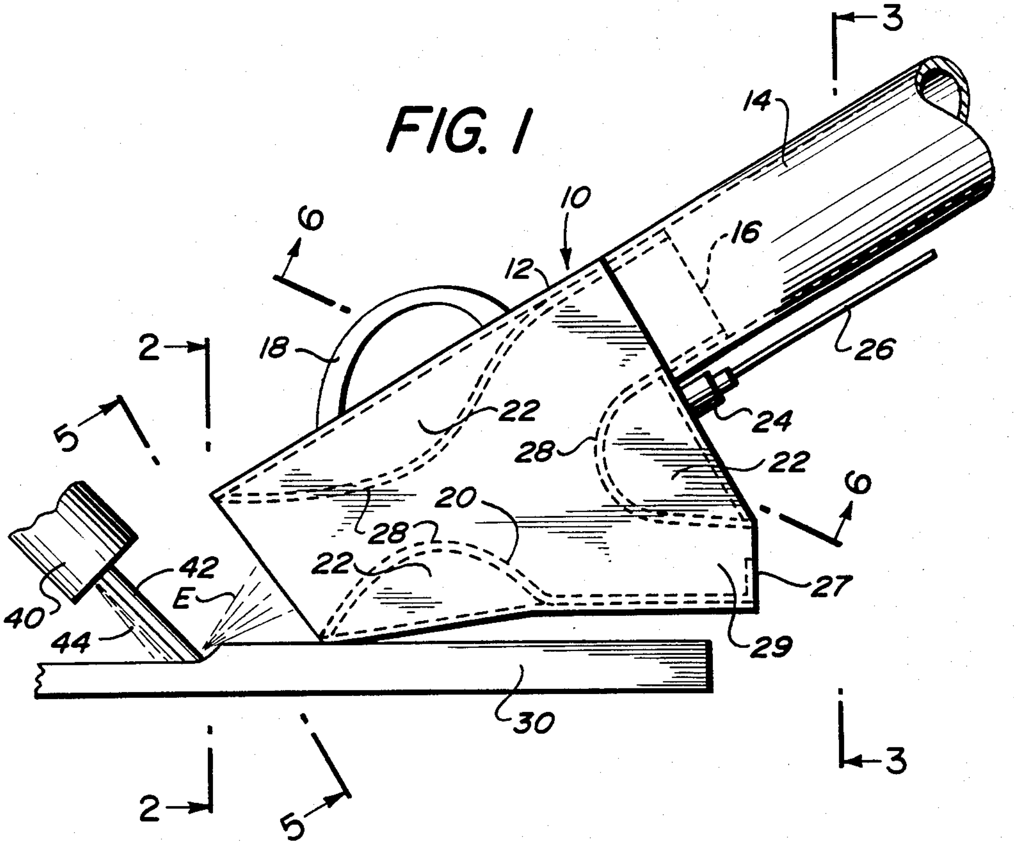
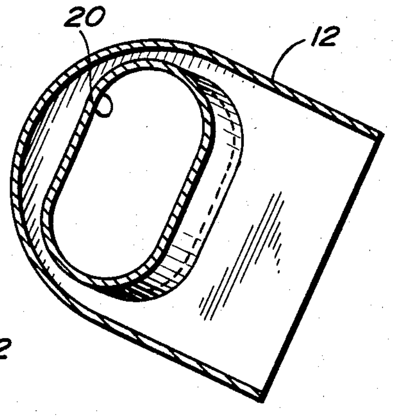
FIG. 6
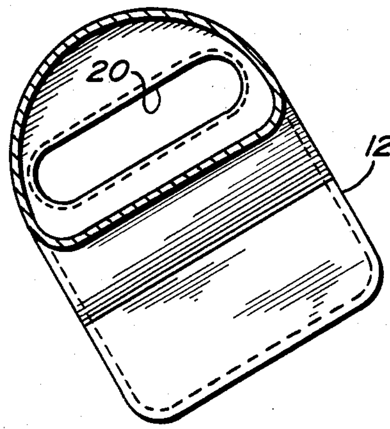
FIG. 5

SLAG AND FUME COLLECTOR FOR AIR CARBON-ARC CUTTING AND GOUGING TORCHES

TECHNICAL FIELD

This invention pertains to the field of collecting fume and/or waste particulate matter (e.g. molten metal and/or slag) generated by the air carbon-arc cutting and gouging process.

The air carbon-arc cutting and gouging process is used to prepare metals for subsequent finishing operations such as welding. In the air carbon-arc cutting and gouging process an electric arc is struck between an electrode and a workpiece to initiate melting of the workpiece under the arc. The molten metal and/or slag produced by the arc is forcibly removed from the workpiece by a stream of high pressure air directed along the electrode toward the arc. The process generates a large amount of fume because of the thermal-chemical reactions and produces waste particulate material in the form of a metal containing slag. With the advent of tighter air pollution control restrictions ways have been sought to prevent the process generated fume and/or slag from being forced into the ambient environment and in particular the environment within which the user of the process has to function.

BACKGROUND OF THE PRIOR ART

One solution to the problem insofar as automatic air carbon-arc cutting and gouging torch is proposed by the inventors in U.S. patent application Ser. No. 269,183, now U.S. Pat. No. 4,426,566. In the device of the patent application a large collector and water cooling is used to quench the molten metal and/or slag particles which are then exhausted along with the water and any process generated gases to a separation device.

Fume collectors have been known for some time and are widely available for use with conventional welding torches. Such devices are associated with a welding torch wherein as the welding proceeds the volumes of fume generated are forcibly removed by creating a partial vacuum in a sleeve disposed near the nozzle of the torch. The collected fume is sucked away from the torch head through a conduit and disposed of in a safe manner is as well known in the air handling art.

U.S. Pat. No. 3,524,038 discloses an accessory that can be used with the air carbon-arc cutting and gouging process for removing solid particulate matter from the vacinity of the arc. The device shown in the '038 patent is a hand-held tool or a machine mounted tool that is used in close proximity to the air carbon-arc cutting and gouging torch. While the device of the '038 patent will remove some process generated fume it will not provide the type of atmosphere movement to comply with current air pollution requirements. Furthermore, a device of this type becomes quickly clogged by the slag that will adhere to the mouth as well as the walls of the nozzle, thus requiring the operator to manually clean the device at frequent intervals.

The literature shows that in Japan installations employing the air carbon-arc cutting and gouging process have utilized conventional tables with a water bath to collect slag generated by the process. The Japanese have further combined the conventional water table with an acoustically lined hood to contain fume and to control the noise level of the process in the immediate environment of the process user. The heavy slag particles fall freely into a receptacle in the lower part of the apparatus which contains a water bath. With a device of this type the slag will stick together or fuse into a solid mass and will adhere to the sidewalls of the receptacle, thus necessitating mechanical removal of the slag from the walls. This type of apparatus is not useable with a hand operated air carbon-arc cutting and gouging torch requiring a fixed installation where the workpiece must be transported to the installation to be treated.

SUMMARY OF THE INVENTION

In order to provide an improved method and apparatus for collecting slag and fume with the air carbon-arc cutting and gouging process and, in particular, for an operator using a hand-held air carbon-arc cutting and gouging torch it has been discovered that constructing a housing with an internal jacket which can be refrigerated provides a surface which after refrigeration and in the presence of moisture, either ambient air moisture or moisture provided from an external source, forms a layer of ice against which the molten metal and/or slag is directed to be very rapidly cooled on contact and dropped or bounced free of the surfaces into a water or other cooling medium. The rapid or "splat" cooling takes place because as the molten particles strike the cold surface coated with ice, steam is instantly formed to cool the particles, the steam also acting as a barrier to prevent adherence of the molten or cooled particles to the inner wall of the housing. Furthermore, the particles are cooled enough so they will not adhere to one another and thus there will be no agglomeration. The particles can then be removed from the housing in granular form.

Refrigeration of the jacketed surface of the housing can be accomplished by utilizing liquid carbon dioxide which is introduced into the housing inside of the jacket and providing at least one orifice on each jacket surface so that the liquid refrigerant expands inside the jacket to a gas which can escape through the orifice in the jacket walls into the interior of the housing where it becomes part of the metal-slag-fume effluent being collected.

BRIEF DESCRIPTION OF THE DRAWING

FIG. 1 is a front elevational view of the apparatus according to the present invention shown in conjunction with a schematic representation of an air carbon-arc cutting and gouging torch and further illustrating internal features of the apparatus with ghost lines.

FIG. 5 is a view taken along the line 5—5 of FIG. 1.

FIG. 6 is a view taken along the line 6—6 of FIG. 1.

DETAILED DESCRIPTION OF THE PREFERRED EMBODIMENT

Figure 4:
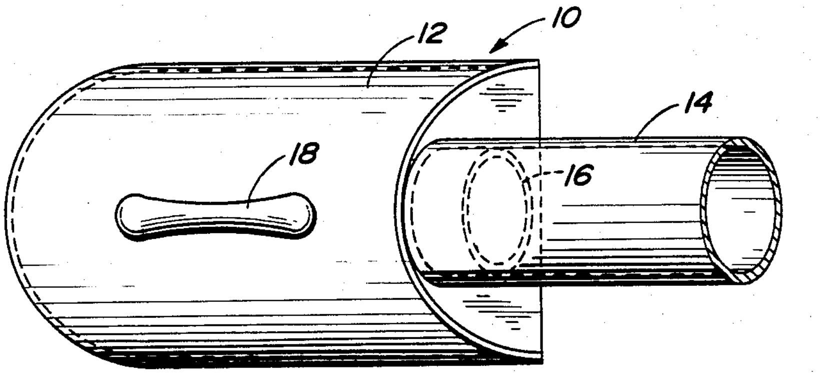
FIG. 4 is a top elevational view of the apparatus of FIG. 1.

The present invention will be described in relation to the air carbon-arc cutting and gouging process as it was first disclosed in U.S. Pat. No. 2,706,236. This patent discloses the method which resides in providing an electrode so that an electric arc can be struck between the electrode and a workpiece to cause portions of the workpiece to melt under the influence of the electric arc. Simultaneously as the arc causes metal to melt, a stream of high pressure air is forced along the electrode to forcibly remove the molten metal from under the influence of the arc. In this manner, the process can be utilized to remove surface defects or completely sever portions of a workpiece.

The air carbon-arc cutting and gouging process generates, depending upon the torch used, from 30 to 250 pounds per hour of molten metallic and oxide slag and various solid and gaseous fumes. At least 95% by weight of this effluent is molten metallic and oxide slag in the form of particles or globs up to ¼ inch in diameter. The quantity of effluent from this process is many times greater than for any conventional arc welding process. Furthermore, the air blast that removes the molten metal and slag from the workpiece under the influence of the arc has a velocity of from 150 to 250 feet per second and accelerates the effluent including the slag particles to high speeds. As molten particles travel through the air, their surface burns producing fine oxide smoke or fume. This burning tends to keep the particles hot as they travel at considerable distance from the point of origin under the arc.

Molten slag particles traveling at high speed striking an object made of any material such as metals, ceramic, plastic, glass and the like will adhere to the surface they strike. After a first layer of particles adheres to a given surface, additional molten particles will adhere to the previous layer of slag particles and rapidly build up into a semi-molten or solid mass. Because of this phenomenon, collection devices made of known materials become quickly coated with slag and also very quickly become clogged with a mass of slag. Agglomeration and adherence of slag particles has prevented development of a useable collection system especially for the hand-held air carbon-arc cutting and gouging torches used in practicing the process. Furthermore, molten particles traveling at short range from the arc, absent a collection device or cooling, may collide and merge with other particles forming a layer particle which because of the increased mass will decelerate and drop to the work surface or other location before smaller particles which will travel a further distance.

The quantity and properties of the air carbon-arc cutting and gouging process effluent have presented very difficult problems in developing an apparatus for collection of the generated effluent especially in relation to the hand operated torches. The nature of the process permits its use in any space on a workpiece that is large enough to allow normal electric arc welding. For this reason, space immediately around the location of its use is frequently small thus adding to the problem of developing adequate collection devices especially for the hot metallic slag which can be damaging to many objects it may impinge upon.

Figure 2:
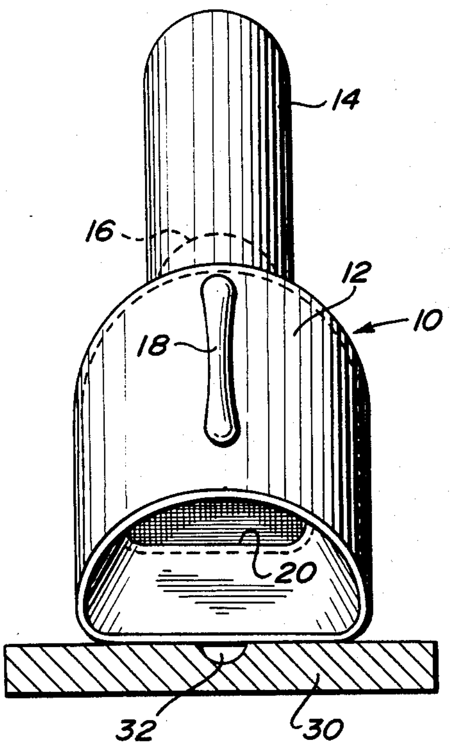
FIG. 2 is a view taken along line 2—2 of FIG. 1.

Referring now to the drawing, FIG. 1 shows the apparatus of the invention 10 in relation to a workpiece 30 and the schematic representation 40 of a hand held air carbon-arc cutting and gouging torch. The collection apparatus 10 includes a housing 12 and an exhaust tube 14 removably fitted to a suitable connector 16 on housing 12. Housing 12 has fitted thereto a handle 18 so that the collector 10 can be positioned on workpiece 30 astride the cut or gouge 32 as shown in FIG. 2 and juxtaposed to the air carbon-arc cutting and gouging torch 40 as shown in FIG. 1.

Housing 12 has included therein a surface or a jacket 20 fabricated from a highly conductive metal preferably copper. The jacket surface 20 defines a plurality of refrigerant chambers 22 which, in turn, communicate with a valve 24 and refrigerant line 26. Projecting portions of the jacket surface 20 include orifices 28 which communicate with the interior 22 of the jacketed portion of the housing 12 and which will permit a gas to escape from the interior portions of the refrigerant chamber 22 as will hereinafter be more fully disclosed.

Figure 3:
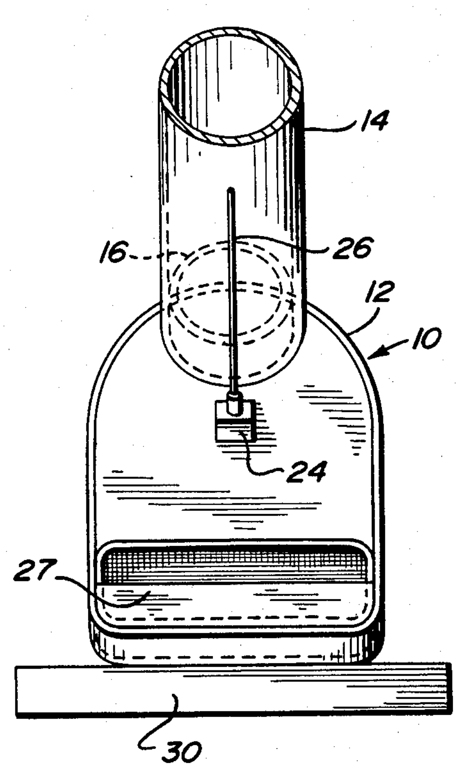
FIG. 3 is a rear elevational view of the apparatus of FIG. 1.

Housing 12 is so constructed with the inner refrigerant jacket so that at the bottom thereof a water and slag and/or metallic particle collection chamber 29 is created. Chamber 29 has fitted outwardly thereof a door or cover 27 (FIG. 3) so that the collected particulate matter and/or liquid can be removed from housing 12.

In operation, supply line 26 is connected to a source of refrigerant such as liquid carbon dioxide. The flow of liquid carbon dioxide to the inner refrigerant chambers 22 is controlled by the valve 24 thus producing a cooling of the surface 20. Assuming there is enough humidity in the air, as the refrigerant is introduced into the refrigerant chambers 22, surface 20 is cooled and condensing moisture forms a layer of ice on the surface. As the refrigerant liquid expands inside chambers 22 a gas is formed which exits through the orifices 28 into the interior of housing 10. Torch 40 by means of electrode 42 and air blast 44, which may also contain water if the humidity in the ambient atmosphere is insufficient to form an ice coating on surface 20, causes portions of the workpiece to become molten thus producing the molten metal and/or slag and/or fume together with a liquid stream as hereinbefore described. The positioning of the collection apparatus 10 and the torch 40 determines the fact that all of the molten metal, molten slag and/or fume will be directed to the interior of the collection device 10 where the molten particles will be forced to at some point strike refrigerated surface 20. Surface 20 is so constructed that all particles that are propelled into the collector 10 strike some portion of the surface which is refrigerated and ice coated so that the surface acts as a means of rapid or splat cooling of the slag particles on contact so that the particles will bounce or drop free of the surfaces into the collection area 29. As the particles strike the cold surface coated with ice, steam is instantaneously formed cooling the particle, the steam acting as a barrier to prevent the particles from adhering to surface 20. Furthermore, the particles are cooled enough so they will not adhere to each other. With the design of the collector, the slag and/or molten metal particles will be deflected from the refrigerated surface into collection area 29 which will contain water and thus can be removed from the device in granular form. Airborne particles are collected through tube 14 by means of a suitable exhaust pump (not shown) as is well known.

The apparatus according to the present invention and the method of very rapid or splat cooling solves the problem of adherence of slag to the collection surfaces heretofore known in the art by utilizing a material of construction having high thermal conduction such as copper, refrigeration of all parts of the collector that are in direct contact with the air propelled molten metal and/or slag, designing the collector so that slag particles and/or metal particles will be deflected from the refrigerated surface into water and removed from the apparatus in granular form.

Utilizing a liquid refrigerant such as liquid carbon dioxide eliminates the need for mechanical refrigeration systems and of the related equipment. Liquid carbon dioxide makes it possible to make a lightweight small and portable collection system which can be started and stopped in a very convenient way for intermittent use. The cost of liquid carbon dioxide is offset by the low cost of the apparatus.

Lastly, utilizing an internal refrigeration jacket with cooled surfaces that redirect the molten particles impinging thereon provides an opportunity for the particles to strike other cooled surfaces to further prevent the particles from bonding to each other creating unmanageable masses of metal and/or slag which can clog the system.

The apparatus of the invention can be used in conjunction with an air carbon-arc cutting and gouging torch in the horizontal, vertical or overhead position. Auxiliary holding devices such as magnets or vacuum chucks can be fixed to the housing 12 to hold the collector 10 in out of position locations on ferrous or nonferrous materials.

Having thus described our invention, what is desired to be secured by Letters Patent of the United States is set forth in the appended claims.

What is claimed is:

1. An apparatus for collecting fume, liquid and/or waste particulate matter as an effluent generated by the air carbon-arc cutting and gouging process comprising in combination:

a housing having an inlet end for juxtaposition to an air carbon-arc cutting and gouging torch to receive the effluent generated by said torch, and an outlet having means to exhaust the effluent received by said housing;

means within said housing to define surfaces upon which molten waste particulate matter generated by said torch will impact;

means to cool said surfaces and form a layer of ice thereon in the absence of impact by said molten waste particulate matter; and means to collect cooled solid particulate matter.

2. An apparatus according to claim 1 wherein said means within said housing upon which said molten waste particulate matter impact is constructed of a highly thermally conductive metal in the form of a refrigerant jacket inside said housing.

3. An apparatus according to claim 2 wherein said metal is copper.

4. An apparatus according to claim 2 wherein said jacketed impact surface includes at least one outlet orifice communicating with the entrance of said housing and means are included to direct a liquid refrigerant to said jacket whereby said liquid expands to a gas and exhausts through surface orifices.

5. An apparatus according to claim 4 where said liquid refrigerant is carbon dioxide.

6. A method for collecting heated solid or molten metal and/or slag generated by the air carbon-arc cutting and gouging process comprising the steps of:

directing said hot or molten metal and/or slag at a refrigerated surface containing a layer of ice in the absence of hot or molten metal striking said surface;

maintaining said refrigerated surface to continuously replace the layer of ice so that as the heated or molten metal and/or slag strikes the surface steam is liberated from the surface;

utilizing said liberated steam to cool and form discrete particles of said metal and/or slag by cooling and subdividing the metal and/or slag into granular form.

* * * * *